United States Patent [19]

Tschudin-Mahrer

[11] Patent Number: 4,564,550

[45] Date of Patent: Jan. 14, 1986

[54] FOAM SEALING TAPE

[75] Inventor: Rolf Tschudin-Mahrer, Lausen, Switzerland

[73] Assignee: Irbit Research & Consulting A.G., Fribourg, Switzerland

[21] Appl. No.: 704,390

[22] Filed: Feb. 28, 1985

[30] Foreign Application Priority Data

Mar. 3, 1984 [DE] Fed. Rep. of Germany ....... 3407995

[51] Int. Cl.⁴ .......................... B32B 1/08; B32B 7/06; A61L 15/00
[52] U.S. Cl. ................................... 428/159; 428/161; 428/317.1; 428/352; 428/906
[58] Field of Search ............ 428/159, 160, 161, 317.1, 428/317.3, 317.7, 352, 906

[56] References Cited

U.S. PATENT DOCUMENTS

| 1,960,137 | 5/1934 | Brown | 428/317.1 |
| 4,021,001 | 5/1977 | Sproat | 428/906 |
| 4,147,825 | 4/1979 | Talalay | 428/906 |
| 4,484,574 | 11/1984 | De Rusha et al. | 428/317.3 |

FOREIGN PATENT DOCUMENTS

| 2506318 | 11/1982 | France | 428/317.3 |
| 825867 | 12/1959 | United Kingdom | 428/317.3 |

Primary Examiner—William J. Van Balen
Attorney, Agent, or Firm—Martin A. Farber

[57] ABSTRACT

A foam sealing tape comprises a foam sealing tape layer and an interlayer strip rolled up together in a compressed form. At least one wide-side surface of the interlayer strip has elevations which press into the foam sealing tape layer.

10 Claims, 9 Drawing Figures

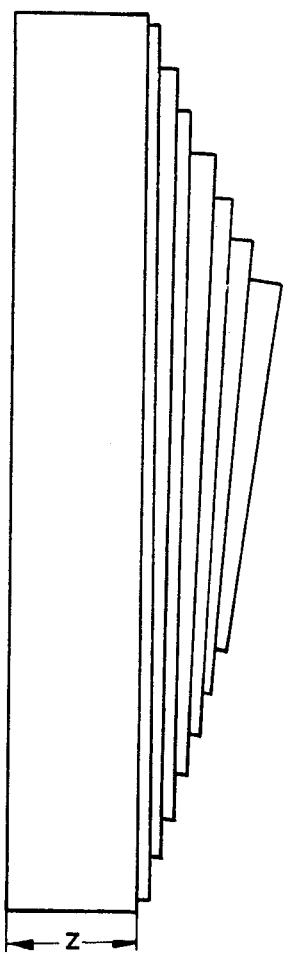
FIG. 1
(PRIOR ART)
FIG. 2
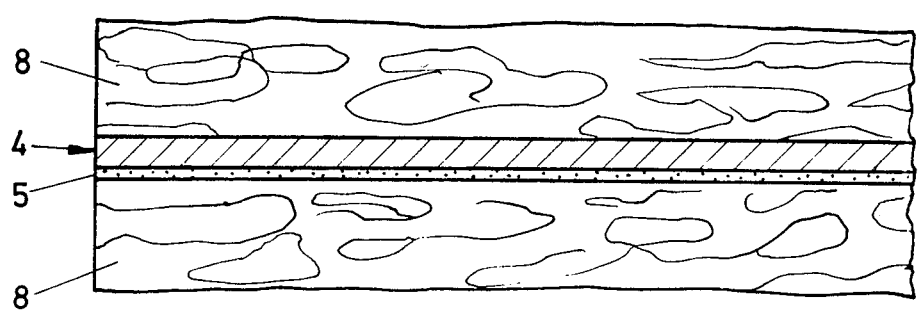

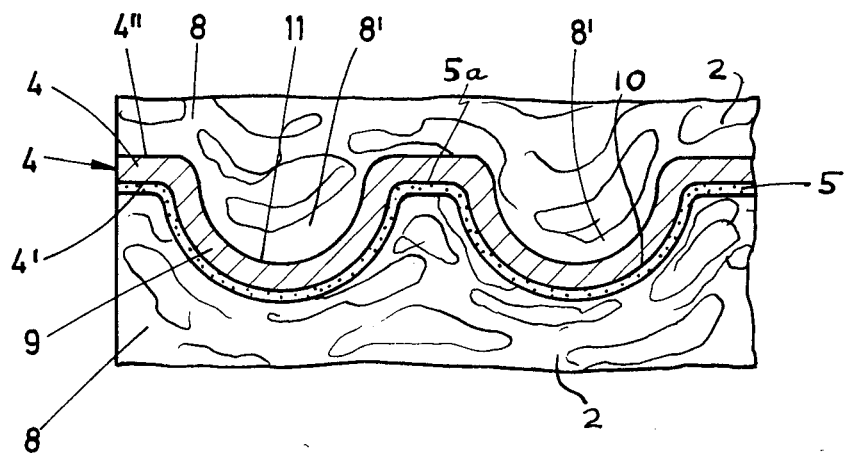
FIG. 3
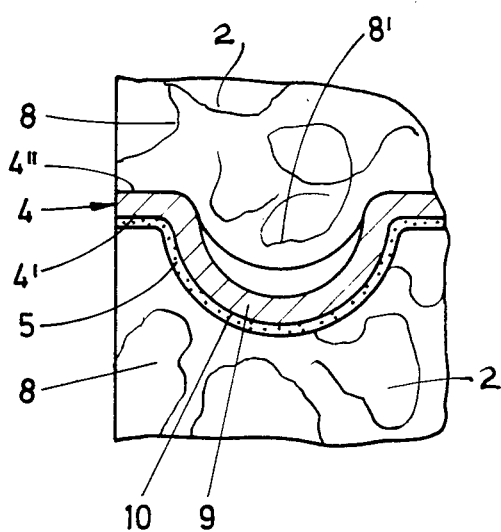
FIG. 4
FIG. 5
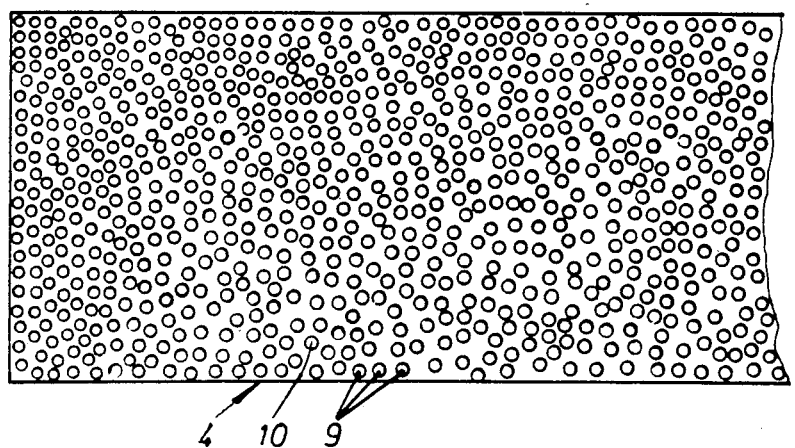

FOAM SEALING TAPE

FIELD OF THE INVENTION

The present invention relates to a foam sealing tape with interlayer strip, which is rolled up in compressed form.

BACKGROUND OF THE INVENTION

The wound interlayer strip relatively easily prevents the expansion of the foam sealing tape which is rolled with compression. The strip consists, as a rule, of a siliconized web of paper. When the sealing tape is unwound, this paper is present on its adhesive-coated back, and can be removed as a result of its anti-adhesive nature. In the case of narrow rolls of foam sealing tape, accuracy of the position of the individual turns of the roll is a problem in cases in which the thickness of the roll is several times the width of the tape. The expansion force of the compressed material, particularly in the case of improper storage, results in a deflecting force component causing the sealing tape to bulge out on one or the other side surface of the roll. In unfavorable cases this leads to a disruption in the structure of the winding, and this can be true of entire shipments. If the material wound is, for instance, foam sealing tape of delayed resilience, this material practically can no longer be used.

The object of the invention is to eliminate this drawback and by simple means to improve the preciseness of the position of the windings of a foam sealing tape of this type, in which connection the tensile stress of the winding which results in the compression can even be further increased.

SUMMARY OF THE INVENTION

According to the invention, at least one wide surface (4') of the interlayer strip (4) is provided with elevations (9) which press into the sealing tape (8).

As a result of this development, a foam sealing tape of this type which is of increased value in use is obtained. While retaining or increasing the space-saving compression, the individual winding layers are held securely against each other. Even improper storage will no longer lead to loosening of the winding. The elevations which extend into the foam structure lead, rather, to a securing of the winding layers in correct position which, however, on the other hand, does not interfere with the unwinding. The elasticity inherent in the material promotes interlocking engagement which is aimed at. The longitudinally oriented tear strength of plastic tape assures even better conditions for use than paper tapes. It is furthermore advantageous if the elevations, which are located on the wide surface (4'), are developed as knobs or bumps. These knobs can easily be produced on the interlayer strip. Due to the fact, furthermore, that the wide surface (4'), provided with the elevations (9), of the interlayer strip (4) of plastic of high tensile strength does not stick to adhesive and that a layer of self-sticking pressure-sensitive adhesive (5) is located between the interlayer strip and the foam, a larger total adhesive surface is obtained as a result of nest- or notch-like supplies of adhesive within the impressed depression zones formed by the elevations. In the case of resilient foam material which does not have delayed resilience, when the interlayer strip is removed and the foam material expands, the depressions (10) may then push out protruding daubs (5b) (FIG. 3A) of adhesive corresponding to the number of elevations (9) projecting beyond (now above) the plane (5a). On the other hand, in the case of a foam sealing tape (8) of delayed resilience, the notch-like supplies of the adhesive in the depressions (10) in the rolled up compressed tape may reverse themselves (by projecting beyond the plane (5a)) subsequently after opening the roll and removing the interlayer strip. In either case, due to the difference in height of sections of the adhesive layer (5), a part of the adhesive layer always is applied first to an object so that corrections in the position of the sealing tape when applied on the object are initially possible. In one case (the non-delayed resiliency foam), a full-surface adhesive bond is obtained by a subsequent firm pressing-on of the tape, while in the other case (delayed resiliency foam) it is obtained by the gradual, time-delayed reversal of the depressions produced by the elevations or knobs.

If the elevations (9) are developed as protrusions (11) which form depressions on the opposite side, a non-shiftable binding is optimized since protrusions of the next turn of the sealing tape force themselves into the depressions. Such an extensively cleft ("rippled") or broken-up deformation structure of the interlayer strip, however, also has advantages with respect to securing the end of the tape, since the closing of the roll is effected by use of the interlayer strip which extends beyond the ends of the foam-sealing tape, the elevations then anchoring themselves in the recesses in the next layer. Therefore, in practice a small length of adhesive strip (12) is sufficient for closing the roll.

With the above and other objects and advantages in view, the present invention will become more clearly understood in connection with the detailed description of preferred embodiments, when considered with the accompanying drawings, of which:

BRIEF DESCRIPTION OF THE DRAWINGS

FIG. 1 is a side view of a roll of wound foam sealing tape with interlayer strip, which clearly shows the above-mentioned bulging of the wound layers;

FIG. 2 is a cross section in the region of the interlayer strip of this foam sealing tape, seen in compressed condition;

FIG. 3 is a corresponding view with an interlayer strip having elevations, also in compressed condition;

FIG. 4 is a corresponding view of a portion of FIG. 3 in expanded condition;

FIG. 5 is a top view of a portion of the interlayer strip;

DETAILED DESCRIPTION OF THE PREFERRED EMBODIMENTS

Figure 6:
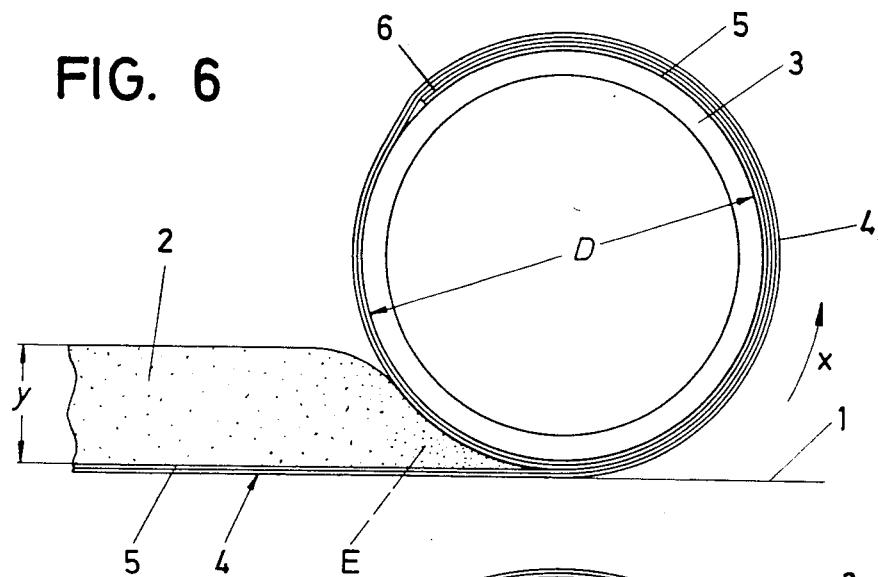
FIG. 6 is a side view looking toward the inner body of the roll in the initial stage of winding.
Figure 7:
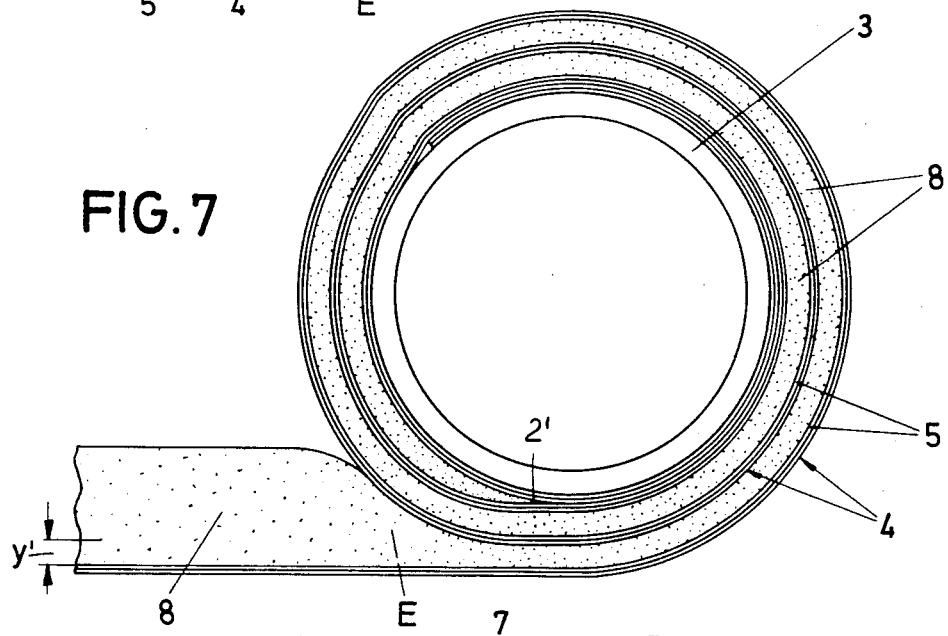
FIG. 7 is a view corresponding to FIG. 6 but with several layers of tape already wound on spirally.

A roll inner body 3 placed on a winding mandrel is used for the winding of an elastically compressible foam web 2, for example made of polyurethane, which travels over a table top 1 (FIG. 6). The width of the roll inner body corresponds to the width of the web which is fed. In the present case, the web is a foam web of delayed resilience, the web being impregnated with a suitable impregnation substance. Together with it, an interlayer strip 4, for example made of polyethylene, of high tensile strength plastic of a width at least corresponding to that of the web is also wound on.

An adhesive polymer layer, for example such as polyvinyl acetate, of pressure-sensitive adhesive 5 is present on the tape side between the interlayer strip 4 and the foam web 2. From the beginning this layer of adhesive can be adhered to the web 2. However, it is preferably initially adhered to the interlayer strip 4 to which it can slightly stick so that the latter is the carrier of the pressure-sensitive adhesive 5. The side 4' of the strip 4 which faces the roll inner body 3 is held in slip-free manner, i.e. firmly, on the inner body 3 of the roll via the end section 6 of the strip 4. This is accomplished by the end section 6 which extends beyond the end 2' of the web 2, in several layers, by utilization of the layer 5 of pressure-sensitive adhesive carried on the strip 4 and wound sticking fast on the roll inner body 3. Increasing the winding tension or tightness makes the fastening stronger so that this end 6 can not come loose. The layer 5 of pressure-sensitive adhesive thus adheres to the outer periphery of the roll inner body 3. Additional anchoring is unnecessary. The adhesive layer 5 also sticks to the foam web 2 relatively much stronger than to the essentially non-stickable surface 4' of the strip 4 so that later when the tape is to be used the strip 4 can be removed from the adhesive 5 which remains on the foam web 2.

While winding the tape up prior to use the tangentially extending interlayer strip 4 (FIG. 6) forms an entrance gusset E with the inner body 3 of the roll. In order to obtain favorable entrance of the foam web 2, the roll inner body 3 has an outside diameter D which is more than twice as great as the thickness y of the uncompressed foam material. In this way there is always a sufficiently large entrance gusset E. Behind it the remaining foam web 2 can now enter. Upon the rotation of the rotatably driven roller inner body 3 in the direction of the arrow x which now takes place, a tensile stress is produced between the upwardly moving roll inner body 3 and the wound supply roll. This initial tension serves to compress the incoming material. The foam web 2 is wound from its start to its end helically or spirally onto the roll inner body 3 with constant, high compressive pressure.

Figure 8:
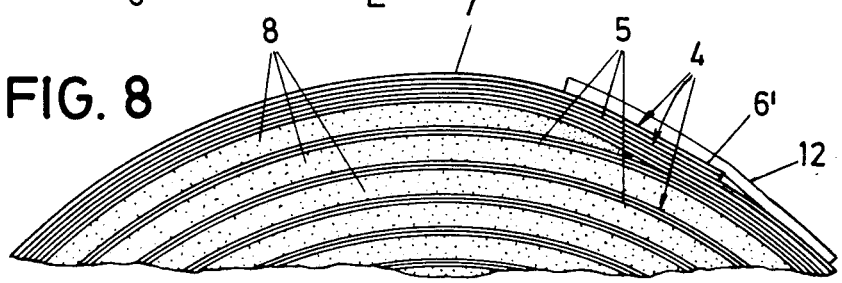
FIG. 8 is a fragmentary view of part of the periphery in the region of the closure of the completely wound final product.

After completion of the winding, the interlayer strip 4 is wound a few further turns on itself, thereby providing an outer wrapping 7 (see FIG. 8) with its end 6' preferably held by a small strip of adhesive tape 12. As a result of this outer wrapping, the compressed shape of the wound material is maintained so that no expansion in radial direction can occur. For economical reasons, a relatively wide roll is wound, which can than, if necessary, be divided into disk-shaped roll sections. One then has a foam-sealing tape 8 which can be unwound as needed. As can be noted from FIG. 1, the tape width z is then a fraction of the diameter of the roll. The resilience of such a sealing tape is about 4 to 5 times the value of the compressed thickness y'. In this connection y corresponds essentially to the width z.

For the reasons mentioned in the introduction the bulging shown in FIG. 1 may occur if nothing further were provided, the layers of winding which lie back to back to each other shifting axially. In order to prevent this, the simultaneously wound interlayer strip according to the invention is provided at least on one (4') of its wide surfaces 4', 4" with elevations 9 which press into the foam sealing tape 8. These elevations are dome-shaped knobs or bumps which are located close to each other. The height of the elevations corresponds to several times the thickness of the foil comprising the interlayer strip 4 which is formed of plastic of high tensile strength.

All illustrated elevations 9 point or project towards the center of the roll. The layer 5 of pressure-sensitive adhesive is located on the knob side 4' and therefore has a larger, extended surface than in the case of a completely flat interlayer strip as used up to now (see FIG. 2). The elevations 9 form corresponding increased surface indentations 10 each having a substantially spherical surface, the base of which is the diameter of a ball.

When the interlayer strip 4, as a result of its adhesive-repelling nature (essentially anti-adhesive or non-stickable, for example by a coating or cover of silicone), is pulled off from the adhesive layer 5 from which it is easily detached, the adhesive layer 5 remains adhered to the foam web 8 thereunder. When the strip 4 is pulled off from the condition of FIG. 3 after the upper adjacent outer winding layer of tape 8, 8' of FIG. 3 has been wound off in order to use the plastic sealing tape 8, then the elastic foam material moves again back into its original unwound condition basically parallel to the plane 5a corresponding to the planar portion of the wide-side surface 4'. This has the result that the portion of the adhesive 5 remaining thereon which was contained in the larger-surface indentations 10 may move out of the indentations 10 (the indentations 10 previously being maintained by the projections 9 of the strip 4) and thus now extend somewhat as protrusions or ripple accumulations 5b as nest-like supplies of adhesive projecting now beyond (above i.e. outwardly of) said plane 5a (FIG. 3A) forming an adhesive raster. If the foam material is not of delayed resiliency these adhesive protrusions 5b spring up beyond plane 5a rapidly. In this way there may be obtained an adhesive pattern as in FIG. 3A, similar to the pattern of elevations 9 and depressions 10 of FIG. 5 which permits subsequent positioning corrections of the sealing tape on an object upon its use. Positioning corrections may be made by lightly placing the tape on the object, since only a part (5b) of the entire adhesive surface contacts the object. By pressing the tape harder, the tape is immovably adhered to the object by utilizing the entire adhesive surface.

Figure 3A:
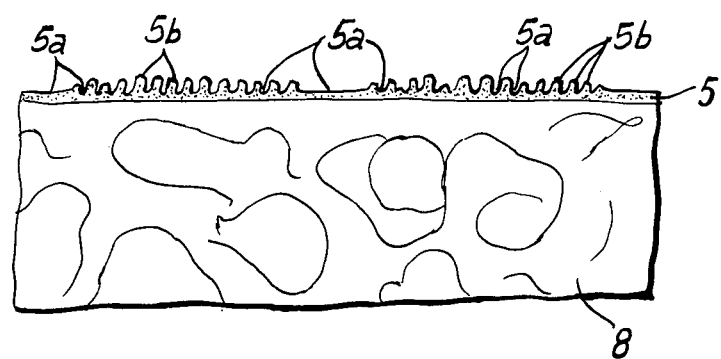
FIG. 3A is a view corresponding to FIG. 3 but showing very schematically a lower, relatively inner winding of the foam-sealing tape of non-delayed resiliency (or of delayed resiliency a long time) after the upper, adjacent relatively outer winding of the foam sealing tape and the interlayer strip have been removed.

If the foam material is, for instance, a sealing tape of delayed resiliency, due for example to a treatment with chlora-paraffin, and with the elevations 9 are formed as protrusions 11 forming depressions 10 on the opposite side, then at first only the flat portions of adhesive at plane 5a exist after the web 4 has been pulled-off (without the protrusions 5b of FIG. 3A yet developing). These flat portions can be placed into adhesive contact with an object on which the tape is used. The adhesive in the depressions 10, on the other hand, due to the delayed resiliency only later may spring up to and tend respectively to project above the plane 5a, which is used only later on for the active adhesive action on the object. Thus the advantage of being able to initially correct a position of the sealing tape is present here also. Furthermore, once again nest- or notch-like supply regions or zones of protrusions 5b of greater accumulation of adhesive are provided.

The elevations 9, which form a highly meandering, dotted or rippled course (FIG. 5) and which are produced by deep-drawing, however, in addition, also have the advantage that the indentations or depressions 10 formed thereby permit the entrance of foam material 8' (see FIG. 3) such that the corresponding layer of foam material of a relatively adjacent outer winding of tape 8 is also secured against sliding (relative the inner adjacent winding of tape 8). This is achieved by penetration of the portions 8' thereof of corresponding shape as the depressions 10 into the depressions 10 of the adjacent inner winding of the tape 8. Such a staggered-plane joint (i.e. interlocking tooth-like interengagement of the adjacent surfaces of the layers 8) with the participation of both adjacent layers of the winding layers 8 (outer and adjacent inner foam-material sealing tape layers 8 in FIG. 3) in addition to preventing relative slipping of the adjacent layers 8, also optimumly guarantees no bulging of the winding. The corresponding depth of anchoring (the tooth-like interengagement) obtained by this staggering of the planes can be increased if the protrusions 9 extend also from the other wide surface 4" radially outwardly (not shown in the detail of the drawings).

Upon the expansion of the successive winding layers into their original condition by unwinding even a portion of the tape for use or even simply removing or releasing the adhesive strip 12 (FIG. 8), the portions of foam 8' which extend into the depressions 10 of the protrusions 11 tend to pull automatically out from same again by resiliency. This is shown in FIG. 4 in an intermediate stage. (The pores have a flater alignment more horizontally in the compressed condition than during or after expansion where they assume a more upwardly and downwardly enlarged shape.) Since there is no layer of adhesive between the upper layer (actually the outer of two layers) and the sealing tape (4, 5, 8) thereunder in FIG. 4, the upper layer can first of all be detached from the interlayer strip 4 therebelow which in this case forms a protective covering for the lower layer, in any event without carrying along with it this interlayer strip 4. This strip 4 via the layer 5 of pressure-sensitive adhesive therebelow, is in somewhat, relatively stronger adhesive contact (although essentially yet non-stickable itself) with the layer of sealing tape there (the lower layer shown in FIG. 4).

The roughening of the interlayer strip 4 obtained, particularly by its protrusions 9, 11, also aids the formation of the peripheral wrapping 7 in that the elevations 9 engage into the depressions 10 of the protrusions 11 of the winding layer located below same so that they are also secured against any tendency to slip in a direction opposite the direction of winding. It is merely necessary to apply the small adhesive strip 12 to the outer end of the interlayer strip and the adjacent exposed region of the layer of the strip located below same.

I claim:

1. A foam sealing tape comprising
   a foam sealing tape layer and an interlayer strip rolled up together in a compressed form,
   at least one wide-side surface of the interlayer strip has elevations which press into the foam sealing tape layer.

2. The foam sealing tape according to claim 1, wherein
   said wide-side surface is formed with knobs constituting the elevations.

3. The foam sealing tape according to claim 1, wherein
   said wide-side surface of the interlayer strip with the elevations is made of plastic of high tensile strength and is essentially non-adhering, and
   a layer of pressure-sensitive adhesive is located between the interlayer strip and the foam sealing tape layer.

4. The foam sealing tape according to claim 3, wherein
   said layer of pressure-sensitive adhesive is located between said one wide-side surface of the interlayer strip and the foam sealing tape layer.

5. The foam sealing tape according to claim 1, wherein
   the elevations are projections which form depressions on their opposite side.

6. The foam sealing tape according to claim 5, wherein
   portions of said foam sealing tape layer of an adjacent winding interengage into said elevations, in said compressed form.

7. The foam sealing tape according to claim 5, wherein
   said foam sealing tape layer has delayed resilience.

8. The foam sealing tape according to claim 1, wherein
   portions of said foam sealing tape layer of an adjacent winding interengage into said elevations, in said compressed form.

9. The foam sealing tape according to claim 1, wherein
   said elevations are projections which project radially inwardly with respect to the rolled up compressed form.

10. The foam sealing tape according to claim 1, wherein
    said elevations are dome-shaped projections.

* * * * *